Dec. 4, 1951 L. E. DONAHUE 2,577,312
ROTATABLE WORK HOLDER FOR ARTICLES TO BE LAPPED OR GROUND
Filed July 30, 1949 3 Sheets-Sheet 1

INVENTOR.
Lawrence E. Donahue
BY
Charles P. Vnytech
Atty

Patented Dec. 4, 1951

2,577,312

UNITED STATES PATENT OFFICE 2,577,312

ROTATABLE WORK HOLDER FOR ARTICLES TO BE LAPPED OR GROUND

Lawrence Edward Donahue, Chicago, Ill., assignor to Crane Packing Company, Chicago, Ill., a corporation of Illinois Application July 30, 1949, Serial No. 107,788

2 Claims. (Cl. 51—217)

This invention relates to work holders for article finishing devices such as lapping and grinding machines, etc.

It is sometimes necessary to form a flat smooth face on a long thin object, the face being formed at a precise angle with respect to the axis of the article. In any one known instance, the angle must be held to within plus eight seconds, minus nothing, the article itself being hexagonal in shape and approximately 1/8" across the flats. The surface itself must be held to an optical flatness and must have a relatively high polish. Lapping or abrading of such surfaces obviously cannot be done with a hand operation except at prohibitive cost.

The object of this invention is to provide a work holder for long thin objects having angularly disposed faces at one end thereof, said holder being adapted to support the work relative to a lapping platen at a precisely held angle.

A more specific object of this invention is to provide a rotatable work holder for long thin objects of the type described in which the articles are individually supported and in which the ends to be operated upon are located in a common plane.

A still further object of this invention is a work holder for articles of the type described wherein means are provided for clamping articles in the holder, the clamping means having a resilient separating device to enable the operator to insert the articles into the device or remove them therefrom.

Yet another object of this invention is to provide a means for locating articles in a work holder with their ends projecting beyond a plane surface on the work holder at precisely the same distance so that the ends are all located in a plane which is parallel to the said surface.

These and other objects and features of this invention will become apparent from the following description when taken together with the accompanying drawings, in which.

Figure 1:
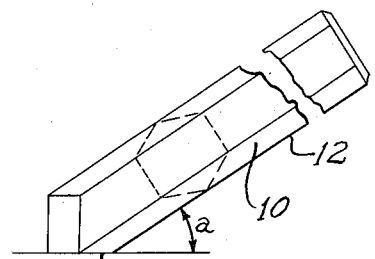
Fig. 1 is an enlarged fragmentary view of an article to which this invention is particularly applicable, the critical angularly disposed surface thereof being shown for purposes of illustration.

Referring now to Fig. 1, the article chosen for illustration is comprised of a thin hexagonal rod 10, the ratio of the thickness taken across the flats to the length being, roughly, 1 to 25. The lower end of the rod is provided with three flat surfaces 11 formed in such a manner that they intersect in lines which are continuations of alternate sections of the rod. The angle "a" between the surface 11 and an edge 12 is exceedingly critical and must be held to within plus eight seconds, minus nothing. The surfaces 11 must be perfectly flat and must have a high polish.

Figure 2:
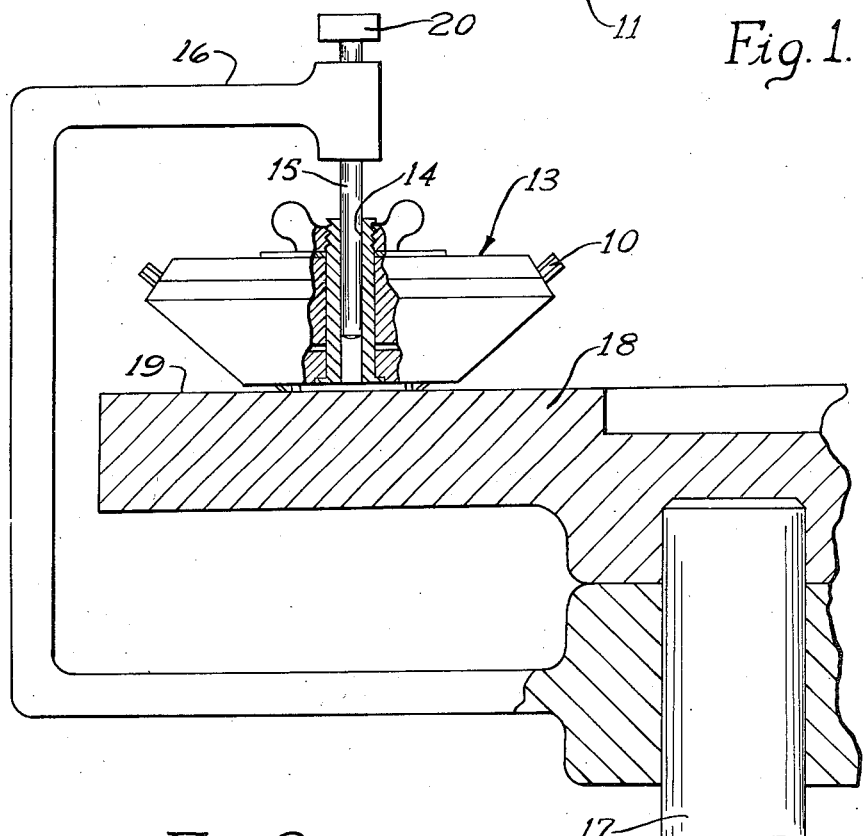
Fig. 2 is a fragmentary section through a lapping machine having a rotatable lapping platen and supporting a work holder made in accordance with this invention.

The fixture for holding a plurality of such rods 10 while the critical surfaces 11 are being lapped is shown at 13 in Fig. 2. Said fixture 13 is provided with a central opening 14 into which projects an axially slidable pin 15 supported in a frame 16 of a lapping machine, preferably of the type disclosed in a copending application of Earl J. Bullard, Serial No. 14,619, filed March 12, 1948, which issued as Patent No. 2,565,590, dated August 28, 1951. Said machine is provided with a rotatable shaft 17 to which is secured a platen 18 having a lapped surface 19 which is perfectly flat. Platen 18 is of course rotatable with shaft 17 so that as the platen rotates past work holder 13, said work holder will be caused to rotate about pin 15, thereby providing continuous movement of the pins over various portions of the lap surface 19. The details of the lapping machine and of the abradant-supplying device on such machine are fully disclosed in the said Bullard application and hence need not be elaborated upon here. It will be apparent, however, that if a plurality of pins 10 are supported in a work holder 13 while the work holder is rotated, said pins must all contact the platen surface 19 simultaneously, otherwise one of said pins will have a surface which is differently located from the surfaces on the remaining pins. In other words, the pin not contacting the lap will not be acted upon by the lap until the other pins have been abraded or lapped to the extent necessary to shorten them to aproximately the size of the pin not acted upon.

It is contemplated in the aforesaid Bullard machine that the weight of the fixture shall be sufficient to maintain the articles in contact with the lap surface and in addition shall supply the requisite pressure to secure a fast lapping action.

For this reason, the opening 14 in the fixture is made somewhat larger than the pin 15 so that a slight adjustment or cocking of the fixture relative to the pin may be possible in order to insure perfect parallelity at all times between the lap surface 19 and the plane containing the ends of the rods. It is understood, of course, that the frame 16 is shown schematically and that it may take any form desirable or necessary to provide the required support for the work holder. It is necessary, however, that pin 15 be capable of moving vertically with respect to lap platen 18 so that the pin 15 may be withdrawn entirely from opening 14 when it is desired to remove fixture 13 from the lapping machine. A nob 20 is provided on the end of pin 15 for this purpose.

Figure 3:
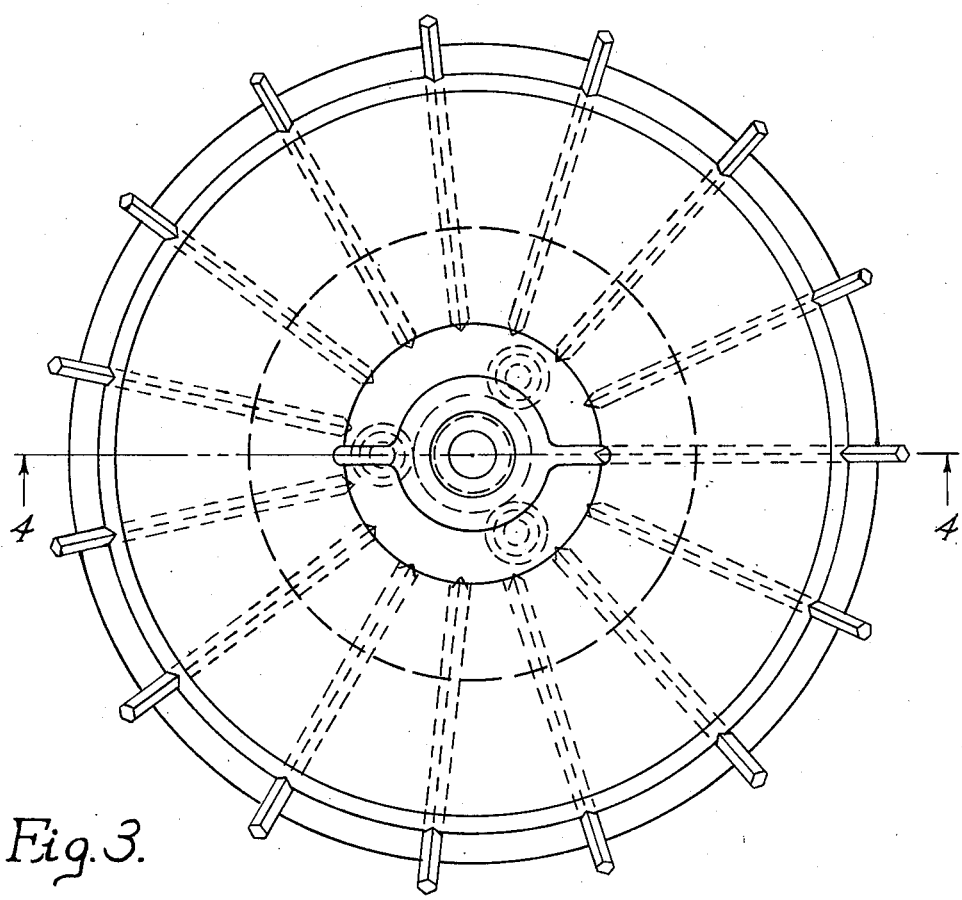
Fig. 3 is an enlarged plan view of the work holder of this invention.
Figure 4:
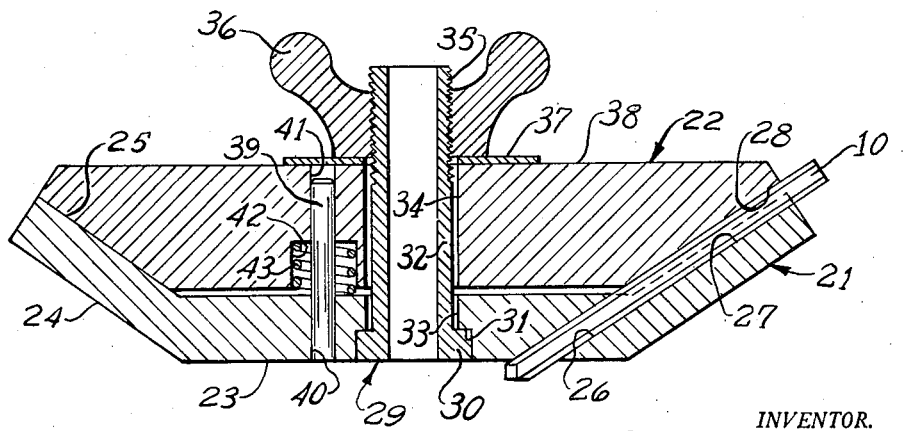
Fig. 4 is a section through the work holder of Fig. 3 taken along line 4—4 thereof.

Referring now to Figs. 3 and 4 for a detailed description of the work holder, there is shown a two-part device having a first part 21 of dished form and a second part 22 adapted to fit within the first part. Said first part 21 has a bottom surface 23 preferably formed perfectly flat and outer and inner conical surfaces 24 and 25, respectively. Said inner surface 25 is tapered at approximately the desired angle "a". A plurality of hexagonal openings 26 are formed in the first part 21 and are preferably reamed so as to be as accurate in form and inclination as possible. The form of the openings is such as to hold the pin 10 therein against turning. Thus it may be a square opening adapted to engage oppositely disposed flat sides of the rod, or it may be a hexagonal opening adapted to fit snugly each of the sides of the rod.

The disposition of the openings 26 in part 21 is such that surface 25 intersects some part of the opening, preferably below a median line drawn through the opening. This leaves a groove 27 in part 21 which is an extension of opening 26. Thus rod 10 may be located in the work holder at any desired angle with respect to surface 23 by the inclination of opening 26 and its grooved extension 27. The inclination of rod 10, however, produces a downward component of force on the rod and it is quite apt to move axially in the opening 26 unless its position relative to part 21 is fixed.

The means for fixing rod 10 in part 21 is the second part 22 which is formed with grooves 28 similar to grooves 27 in form so that by clamping part 22 to part 21 with only the grooves 28 of part 22 contacting rods 10, the latter will be held in place against groove 27 and will not move axially therein.

The clamping means is comprised additionally of a bolt 29 having a head 30 abutting on a recessed shoulder 31 on part 21 and having a shank portion 32 passing through openings 33 and 34 in parts 21 and 22, respectively. The upper end of bolt 29 is threaded as shown at 25 to receive a wing-nut 36 adapted to advance along threads 35 into contact with a washer 37 adjacent the upper surface 38 of part 22. Thus by advancing wing-nut 36 on bolt 29, part 22 is clamped against part 21 through the rods 10. When so clamped, the two parts and the rods form a rigid structure which may be handled as a unit and slid over the pin 15 of the lapping machine as hereinabove described.

It is noted from Fig. 3 that a plurality of rods may be operated upon at the same time with the work holder of this invention. The rods are disposed along radii so as to resemble the spokes of a wheel.

When inserting rods 10 into the work holder, or when removing finished rods therefrom, it is desirable merely to separate the two parts 21 and 22 without necessarily disassembling the entire work holder as would be the case if the wing-nut 36 were completely backed off threads 35. To facilitate a separation without a complete disassembly, three equally spaced locating pins 39 are provided, the pins passing through openings 40 and 41 in parts 21 and 22, respectively. One end of each pin 39 may be press-fitted into one or the other of the parts while the other end has merely a snug fit with the remaining part so as to permit relative motion between the parts. The part with the snug fit, e. g., part 21, may be provided with an enlarged opening 42 in which is disposed a spring 43 of such length and strength as to hold part 22 spaced from part 21 when wing-nut 36 is backed off threads 35 a predetermined distance. This separation is just sufficient to permit the insertion of rods 10 between grooves 27 and 28 and for the removal of such rods from the holder when they have been completely lapped.

As stated above, it is important that initially the ends of the rods all lie on a common plane. This is desirable not only from the standpoint of uniformity of results to be obtained, but because of the customary slotted construction of lap surface 19. If one of the rods extended inward farther than the remaining rods, it would then be compelled to support the weight of the holder and as it slides into a slot, the rod will be caught on the edge of the slot and would damage either the lap or the rod, or both, depending on which is hardest. With all of the rod ends in a common plane, the work holder is supported by all of the rods so that as one of them passes over a slot, the position of the holder relative to the lap surface 19 is not changed and therefore the rod end passes over the slot without being pressed into it.

Figure 5:
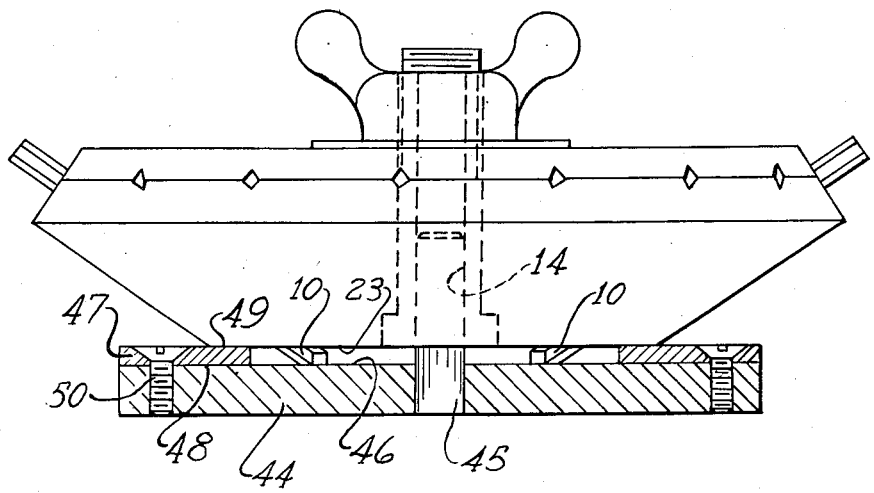
Fig. 5 is an elevation through a work holder and a positioning means for the articles to be supported by the work holder, the positioning means being shown in section.

The means for locating the rods in the work holders so that the rod ends all lie in a common plane is shown in Fig. 5. It is comprised of a plate 44 having a centrally located pin 45 adapted to enter the opening 14 in bolt 29, thereby definitely locating the work holder with respect to plate 44. The upper surface 46 of plate 44 is preferably lapped or otherwise made perfectly flat. Secured to the upper surface 46 is a ring 47, the surfaces 48 and 49 of which are lapped flat and parallel. Said ring 47 is secured to plate 44 by a plurality of screws 50. The upper surface 49 of ring 47 engages surface 23 of part 21 and thereby supports the work holder over plate 44. The thickness of ring 47 is equal to the axial distance which rods 10 are to extend beyond surface 23 on part 21. The inner diameter of ring 47 is greater than the diameter of a circle circumscribing the openings 46 at surface 23 so that the openings are unobstructed by ring 47.

When it is desired to load the work holder with rods 10, the holder is slid over pin 45 until it rests on ring 47. With wing-nut 36 backed partially off bolt 29 so that the springs 43 are effective to separate the parts 21 and 22, the rods 10 are inserted in the openings formed by opposed grooves 27 and 28 until their ends contact surface 46. When all of the rods have been so positioned, wing-nut 36 is tightened until all of the rods are firmly held in place. The rods are thus properly located so that the ends are all in a common plane and the holder may be transferred as a unit to the lapping machine. When the end surfaces of the rods have been completely lapped, the wing-nut may be backed off as before and the rods removed, turned, and then reinserted in their respective spaces so that another surface on the ends thereof may be lapped. This procedure is continued until all surfaces have been lapped, whereupon the parts 21, 22 are again separated to permit a complete removal of the finished rods from the fixture and the insertion of other rods thereon.

It has been found that the work holder hereinabove described and the positioning of means shown in Fig. 5 give excellent uniformity of result combined with considerably increased production and the maintenance of a high degree of accuracy. Obviously the work holder is adapted for use with other shapes of rods and various angles of surfaces to be formed on the ends of the rods, from surfaces normal to the axes of the rods, to surfaces at extremely acute angles with respect thereto. As described in the aforementioned Bullard application, a plurality of work holders of the type herein described may be used simultaneously with one lap platen, thereby multiplying the production by the number of such holders used.

It is understood that the foregoing description is illustrative of preferred embodiments of this invention and that the scope of the invention is not to be limited thereto, but is to be determined by the appended claims.

What is claimed is:

1. A rotatable holder for long thin objects of which the cross section is a regular polygon and the end surfaces of the objects are to be finished by lapping or the like, said holder comprising a dished member having a substantially flat bottom and conical sides, said sides having grooves to receive a portion of the objects and said bottom having openings of the same cross section as the said objects aligned with the grooves through which other portions of the objects extend, a second member adapted to fit into the first member and contacting the objects over a substantial length of said objects, a hollow bolt passing through both members, and a nut for the bolt for clamping the members together, thereby to clamp the objects between the members, said hollow bolt being adapted to receive a pivot pin about which the holder may rotate.

2. A rotatable holder for long thin objects as described in claim 1, and means for locating the objects in the holder with the ends of the objects extending a uniform amount beyond the holder, said means comprising a plate, a spacer ring on the plate adapted to contact the holder and locate the plate uniformly from the holder, the ends of said objects extending beyond the holder and contacting the plate, and a pin on said plate extending into the hollow bolt to locate the plate with respect to the holder.

LAWRENCE EDWARD DONAHUE.

REFERENCES CITED

The following references are of record in the file of this patent:

UNITED STATES PATENTS

| Number | Name | Date |
| --- | --- | --- |
| 1,227,498 | Sleeper | May 22, 1917 |
| 1,279,725 | Liebmann | Sept. 24, 1918 |
| 1,405,474 | Yehle | Feb. 7, 1922 |
| 1,426,965 | Crowther | Aug. 22, 1922 |
| 1,763,647 | Danner | June 17, 1931 |
| 1,823,537 | Saudreau | Sept. 15, 1931 |
| 2,116,922 | Bleasdale | May 10, 1938 |
| 2,352,551 | Kende et al. | June 27, 1944 |
| 2,389,069 | Mascarenhas | Nov. 13, 1945 |
| 2,466,610 | Newman | Apr. 5, 1949 |

FOREIGN PATENTS

| Number | Country | Date |
| --- | --- | --- |
| 21,996 | Great Britain | of 1913 |
| 517,290 | France | Dec. 17, 1920 |
| 674,027 | Germany | Apr. 3, 1939 |